United States Patent
Beck et al.

(10) Patent No.: US 7,609,019 B2
(45) Date of Patent: Oct. 27, 2009

(54) PHOTOVOLTAIC SYSTEM AND METHOD FOR OPERATING A PHOTOVOLTAIC SYSTEM

(75) Inventors: Bernhard Beck, Volkach OT Dimbach (DE); Thomas Neussner, Kolitzheim OT Zeilitzheim (DE); Constantin Wenzlik, Würzburg (DE)

(73) Assignee: Adensis GmbH, Dresden (DE)

( * ) Notice: Subject to any disclaimer, the term of this patent is extended or adjusted under 35 U.S.C. 154(b) by 356 days.

(21) Appl. No.: 11/756,814

(22) Filed: Jun. 1, 2007

(65) Prior Publication Data
US 2007/0290636 A1 Dec. 20, 2007

(30) Foreign Application Priority Data
Jun. 3, 2006 (DE) .................... 10 2006 026 073

(51) Int. Cl.
*H02P 1/04* (2006.01)
(52) U.S. Cl. ............................ 318/480; 318/139
(58) Field of Classification Search ................ 318/139, 318/140, 480, 432, 434, 609
See application file for complete search history.

(56) References Cited

U.S. PATENT DOCUMENTS

| 4,131,827 | A | | 12/1978 | Larrabee |
| 4,471,286 | A | | 9/1984 | Heinrich et al. |
| 4,494,180 | A | * | 1/1985 | Streater et al. ................ 363/37 |
| 4,649,287 | A | * | 3/1987 | Nola ............................ 307/31 |
| 4,718,233 | A | * | 1/1988 | Barrett ........................ 60/496 |
| 4,831,277 | A | * | 5/1989 | Christopher ................ 290/1 A |
| 5,449,959 | A | * | 9/1995 | Yang ............................ 307/81 |
| 6,774,299 | B2 | * | 8/2004 | Ford ............................ 136/244 |
| 2003/0011348 | A1 | | 1/2003 | Lof et al. |
| 2003/0169006 | A1 | | 9/2003 | Allen |
| 2005/0116671 | A1 | | 6/2005 | Minami et al. |

FOREIGN PATENT DOCUMENTS

| DE | 35 16 876 A1 | 11/1985 |
| DE | 20 2006 002 726 | 4/2006 |
| GB | 2 176 667 A | 12/1986 |
| WO | WO 00/51220 | 8/2000 |

* cited by examiner

*Primary Examiner*—Rina I Duda
(74) *Attorney, Agent, or Firm*—Henry M. Feiereisen; Ursula B. Day

(57) ABSTRACT

A photovoltaic system includes a plurality of photovoltaic modules and a DC motor connected to a three-phase generator driven by a shaft. The three-phase generator is connected to a power mains. The electric power supplied to the DC motor by the plurality of photovoltaic modules is repeatedly measured and adjusted, by changing an external excitation current of the DC motor, to the peak power attainable at the current ambient temperature and the current incident solar radiation intensity. The peak power is preferably determined by incrementally changing the excitation current in predetermined time intervals, until the supplied electric power produces a power level which can be regarded as the peak power.

23 Claims, 2 Drawing Sheets

PHOTOVOLTAIC SYSTEM AND METHOD FOR OPERATING A PHOTOVOLTAIC SYSTEM

CROSS-REFERENCES TO RELATED APPLICATIONS

This application claims the priority of German Patent Application, Serial No. 10 2006 026 073.2-32, filed Jun. 3, 2006, pursuant to 35 U.S.C. 119(a)-(d), the content of which is incorporated herein by reference in its entirety as if fully set forth herein.

BACKGROUND OF THE INVENTION

The present invention relates to a photovoltaic system with one or more photovoltaic modules producing power that can be supplied to a power mains, and more particularly to a method for operating a photovoltaic system at peak power.

Nothing in the following discussion of the state of the art is to be construed as an admission of prior art.

In conventional photovoltaic systems, the DC current supplied by the photovoltaic modules is converted to an AC current with an electric converter or inverter, and the AC power is then fed to the power grid. Electric converters/inverters are presently commercially available for large systems designed for a total power output of up to 700 kW. However, these systems tend to be expensive. System with larger output power require several electric converters/inverters. For example, at least 9 electric converters/inverters are used today for a solar facility with an output power of 2.5 MW, with each converter/inverter having a power rating of 330 kW.

Although electric converters/inverters have a high power conversion efficiency, the capacitors in the system tend to produce a sluggish response to changes in the operating conditions. For example, the control unit of the converter/inverter may take between 20 seconds and 3 minutes before adapting to changes in the instantaneous incident solar radiation intensity.

The invention is based on the realization that in particular for larger systems, i.e., of 800 kW and above, the converter/inverter should be implemented as a combination of a single DC motor and a single AC generator. DC motors and AC generators with such high power ratings are commercially available. Such a motor/generator combination is much less susceptive to statistic failures due to the smaller number of components than a system using a plurality of electric converters/inverters. The combination also requires less maintenance. It is also advantageous that only a single unit has to be monitored during operation.

Use of a motor-generator combination for operating a solar system is disclosed, for example, in the German utility model application DE 20 2006 002 726 U1. However, this application only addresses the mechanical characteristic of the motor-generator combination and proposes to arrange several pole wheels on a shaft, with each pole wheel operating inside their own stator. This measure is intended to increase the conversion efficiency for regenerative energy generation.

There is still a need for extracting, preferably without losses, the maximum peak power from a photovoltaic system employing a DC motor-AC generator combination connected to a stationary power grid, independent of changes in the ambient temperature and in the incident solar radiation intensity.

SUMMARY OF THE INVENTION

According to one aspect of the present invention, a method for operating a photovoltaic system, which includes a DC motor electrically connected to a plurality of photovoltaic modules and a three-phase generator driven by the DC motor and electrically connected to a power mains, includes the steps of repeatedly measuring the electric power supplied by the photovoltaic modules to the DC motor, and changing an excitation field of the DC motor to adjust the supplied electric power to a peak power which the plurality of photovoltaic modules is capable of delivering at a current ambient temperature and at a current incident solar radiation intensity.

According to another aspect of the present invention, a photovoltaic system includes a plurality of photovoltaic modules, a DC motor with an input electrically connected to the photovoltaic modules and receiving from the photovoltaic modules a DC voltage and a DC current, and a three-phase generator driven by the DC motor via a shaft, with the generator producing an AC output voltage capable of being supplied to a power mains. The photovoltaic system further includes a first control unit having two inputs and an output, wherein a first of the inputs receives the DC voltage from the DC motor, and a computing unit having a first input receiving the DC voltage from the DC motor and an output producing an output signal. The output signal is iteratively computed and adjusted by the computing unit commensurate with a maximum permissible peak power for the current incident solar radiation intensity and the current ambient temperature. The output signal is then supplied to the second input of the first control unit, wherein in response to the signals received at the first and second input, the first control unit produces at the output an output signal which causes an excitation field of the DC motor to change, so that the DC motor generates the maximum permissible peak power.

According to another feature of the present invention, the supplied electric power may be determined by measuring the DC voltage received at the DC motor and the DC current supplied to the DC motor by the photovoltaic modules.

The peak power may be determined and adjusted in small steps, for example, by stepwise changing an excitation current of the DC motor in predetermined time intervals until the supplied electric power produces a power level which can be regarded as the peak power.

However, after determining the maximal value of the power level, the incident solar radiation and/or the temperature and/or the load may slightly change, requiring a slight adjustment in the peak power value. The optimal value of the excitation current that corresponds to the peak power must therefore be tracked. This may be achieved, for example, by identifying, after the peak power level has been determined, a change in the peak power level by incrementing or decrementing the excitation current in defined time intervals, and setting the peak power to the changed peak power level.

Increasing and decreasing the excitation current in small steps can be continued, resulting in an oscillatory behavior and a possible change in the peak power level that can subsequently also be measured and adjusted.

This "oscillatory behavior" should also be measured, for example, even when temperature and the incident solar radiation intensity are constant and the AC power mains is fixed, and no significant changes are expected. According to this operating mode, the determined peak power is maintained for approximately constant ambient temperature and approximately constant incident solar radiation intensity and fixed AC power mains by causing the excitation current to incrementally oscillate in predetermined time intervals about an optimum excitation current that produces the peak power.

Each defined time interval may less than 1 second, preferably less than half a second. The time required for starting up the photovoltaic system may be shortened by incrementally increasing the excitation current from a first predetermined experimental value to an optimum excitation current that produces the peak power, or by incrementally decreasing the excitation current from a second predetermined experimental value to the optimum excitation current that produces the peak power.

According to yet another feature of the Present invention, the actual value of the DC voltage of the photovoltaic module may be applied to the first input of the computing unit and the actual value of the DC current of the photovoltaic module may be applied to the second input of the computing unit, and the output signal may be iteratively computed and adjusted by also taking into account the actual value of the DC current. The first control unit may include a proportional-integral (PI) controller.

According to another feature of the present invention, the DC motor may be an externally excited DC motor, and the output signal of the first control unit may control an excitation current of the DC motor. In this way, the armature circuit and the excitation circuit of the DC motor are not connected with one another, but are only coupled magnetically. As a result, the corresponding specific peak power level for the instantaneous incident solar radiation intensity and the instantaneous temperature can be adjusted essentially loss-free.

According to another feature of the present invention, the system may include an excitation current measuring unit and a second control unit having two inputs and an output. The output signal of the first control unit is applied to a first input of the second control unit and an excitation current signal measured by the excitation current measuring unit is applied to the second input of the second control unit. The second control unit may also be a proportional-integral (PI) controller.

The DC motor may advantageously be excited by supplying the excitation current from a converter receiving electric power from the power mains.

The afore-described photovoltaic system has a long service life.

It has been confirmed through experimentation that the system achieves quickly, usually within several seconds, peak power (MPP). The system automatically adjusts to the new operating point in response to a change of external parameters, such as temperature, incident solar radiation intensity or changes in the AC power grid while retaining the aforementioned advantages: The system employs only a single electromechanical conversion device, consisting of the DC motor, the AC voltage generator, and a shaft connecting the motor and the generator. This reduces maintenance costs, and with appropriate care also increases the service life, compared to a system with a large number of electric converters/inverters. Converter units of this type are presently commercially available for a power of up to 2.5 MW.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
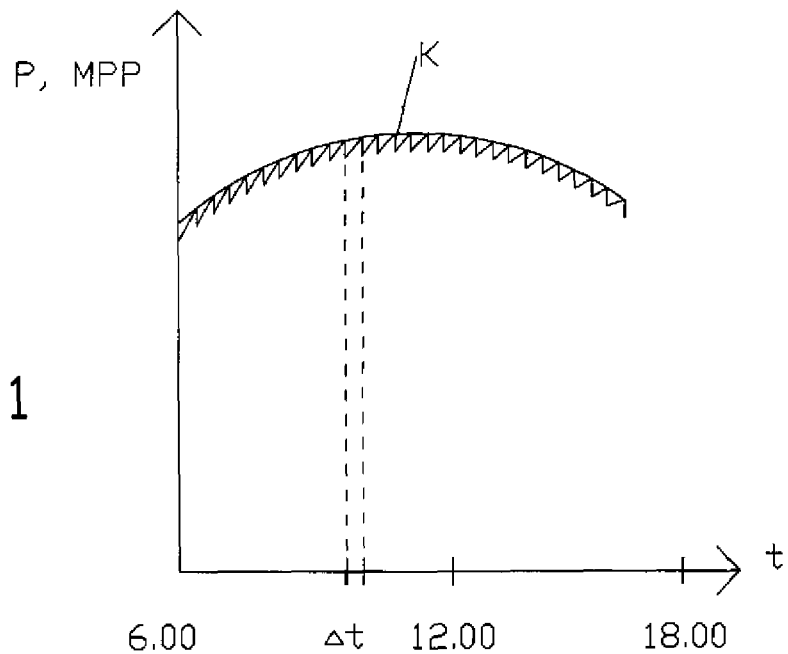
FIG. 1 is a schematic diagram of the peak power MPP of a solar generator as a function of the time t of day from 6 a.m. until 6 p.m.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is depicted as a continuous curve K the peak power MPP (peak power point) that a photovoltaic system can supply over the course of one day, indicated by time t, between 6 a.m. and 6 p.m. It will be assumed that there are no clouds or no large temperature changes occur.

According to the proposed exemplary method, the curve K is determined by measuring the power P in regular time intervals t, and by adjusting the determined peak power point MPP so as to obtain the maximum possible peak power MPP from the solar generator, which is in turn supplied to the energy converter implemented as an externally excited DC motor coupled to a three-phase AC generator (see FIG. 4) which is in turn connected to a three-phase AC current grid. The oscillatory sampling with a computing unit and a connected proportional-integral (PI) controller is indicated by the jagged shape of the solid curve K. However, it should be noted that the sampling time intervals Δt are in the range of one second, preferably about half a second or less. As a result, the diagram MPP(t) over the course of the day and illustrated in FIG. 1 is not to scale.

Figure 2:
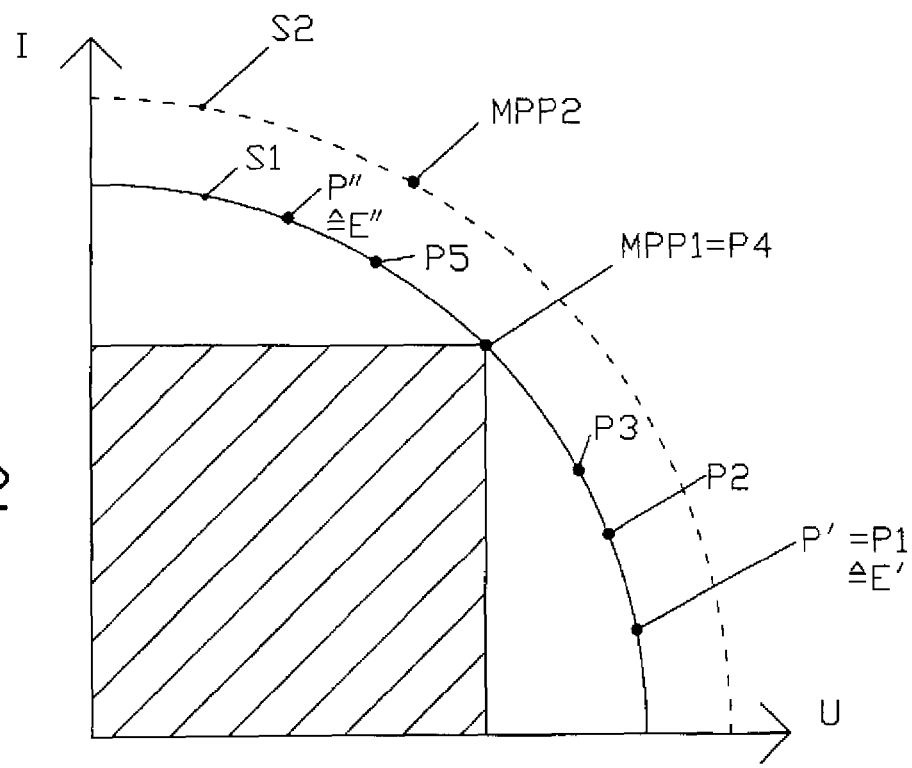
FIG. 2 shows a typical current/voltage curve I(U) of a photovoltaic system.

The continuous characteristic curve S1 of FIG. 2 shows a typical current/voltage characteristic I(U) of a photovoltaic system at a certain temperature and a certain incident solar radiation intensity. The characteristic curve S1 has a peak power point MPP1. This point MPP1 is defined so that the hatched area is a maximum, corresponding to the peak power P that can be supplied by the solar generator.

The aforementioned electromotive converter is controlled, as will be described in more detail below, to this power point by an iterative approximation. To this end, an upward and downward control operation is performed several times along the curve S1 starting, for example, at the point P' or the point P''' until the peak power point MPP1 has been reached. The points P' and P''' thereby correspond to experimental starting points E' and E''', respectively, from where on the excitation current E is incrementally increased or decreased.

The iterative approximation will now be explained with reference to an arbitrarily selected example.

It will be assumed that P1, corresponding P', is the starting point. This value P1 then yields the first measurement of I and U from which the power P supplied by the photovoltaic modules to the DC motor can be determined (see FIG. 3). After a time Δt=0.5 sec, the control unit (see FIG. 3) changes the excitation current E slightly via the first control unit (see FIG. 3). As a result, the DC voltage U decreases. The computing unit now determines from the new values of I and U a power value P2. The computing unit also determines that the power value P2 has increased compared to the previous power value P1.

After an additional time Δt=0.5 sec, the computing unit again slightly changes the excitation current via the control unit, which causes another decrease in the DC voltage U. The computing unit now determines a power value P3 and determines again that this power value P3 has increased compared to the previous power value P2.

After a time Δt=0.5 sec, the excitation current is again slightly changed and an even greater power value P4 is reached. It will be assumed that this is indeed the peak power value MPP1; however, the computing unit is actually not able to ascertain this.

After another time Δt=0.5 sec, the computing unit decreases the voltage U again with the afore-described process by changing the excitation current. The computing unit now measures the value P5 and determines that the power has decreased from P4 to P5. At that time, the peak power value MPP1 must therefore have been located somewhere between the values P3 and P5.

After another time Δt=0.5 sec, the computer unit increases the DC voltage U which causes the power P at point P4 to increase. To test this condition, the computer unit returns after a time Δt to the point P3, whereafter it then returns to the point P4 and also tests point P5 again.

The computing unit therefore continuously attempts to maintain the power point MPP1 by oscillating about the power point P4, i.e., by increasing and decreasing the DC voltage U.

Figure 3:
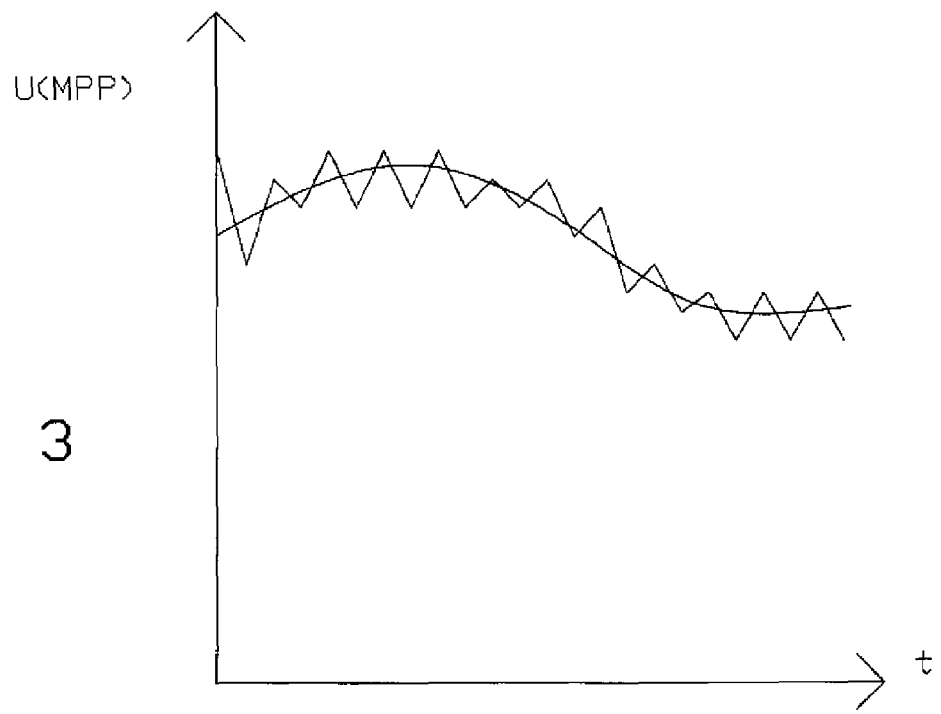
FIG. 3 shows schematically an U-t curve.

FIG. 3 shows a diagram of the voltage as a function of time U(t). The continuous curve U(MPP) thereby corresponds to the ideal voltage at the peak power point MPP, whereas the jagged curve corresponds to the incremental approximation to the corresponding ideal voltage.

It should be mentioned that the corresponding power P in FIG. 2 is defined by the rectangles which bound the individual points. Of these rectangles, only the rectangle associated with P4 is emphasized by hatching.

The characteristic curve S1 in FIG. 2 continuously changes depending on the incident solar radiation intensity and/or the temperature. If a change occurs, the dotted curve S2 may be obtained. This produces a new peak power point, for example the value MPP2. With the afore-described control method, the DC voltage U is adjusted so that the solar generator is operated at the new peak power point MPP2.

Figure 4:
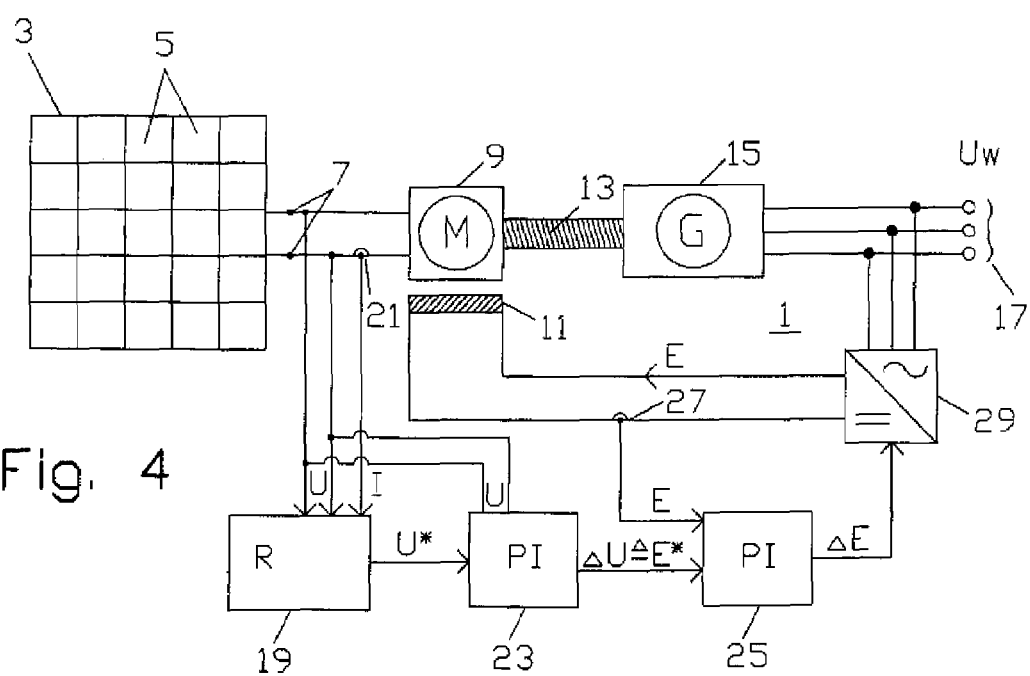
FIG. 4 shows a photovoltaic system according to the invention.

FIG. 4 shows a photovoltaic system 1 with a solar generator 3 having a plurality of photovoltaic modules 5. Each module 5 in turn includes a plurality of photovoltaic cells. The modules 5 are connected in a conventional manner in series and have terminals 7 at their respective ends at which the generated DC voltage U and the resulting DC current I can be obtained. Depending on the DC current I consumed by the load connected to terminals 7, a DC voltage U corresponding, for example, to the voltage depicted in the curves S1 and S2 of FIG. 2 can be supplied.

A DC motor 9 is connected to terminals 7. The DC motor is implemented as an externally excited DC machine with an excitation winding 11. The shaft 13 of the DC motor 9 drives a three-phase AC generator 15, in particular a three-phase generator with a higher output voltage. The generator 15 is connected to a three-phase power grid 17, supplying an AC voltage $U_W$. In the exemplary embodiment, the three-phase power grid 17 is a public power grid operating at a constant voltage of, for example, 400 V and at constant frequency. The generator 15 operates in normal operation with a constant rotation speed (RPM) and is synchronized with the frequency of the three-phase power grid 17 in a conventional manner.

In addition, a computing unit 19 is provided for, among others, calculating the peak power point MPP of the solar generator 3. The computer unit has a first input to which the DC voltage U at the DC motor 9 is applied. The second input of the computing unit 19 receives from a current measuring unit 21 the instantaneous value of the DC current I which is supplied by the solar generator 3 to the DC motor 9.

The computing unit 19 generates an output signal for determining the maximal power point MPP of the solar generator 3 at the actual incident solar radiation intensity and the actual temperature. As discussed above with reference to FIG. 2, the output signal is provided every 0.5 sec and can be regarded as a new nominal value U* for the DC voltage U.

The new nominal value U* is supplied to the second input of the first control unit 23, whereas the DC voltage U at the DC motor 9 is supplied to the first input. The control unit 23 is preferably a proportional-integral controller (PI-controller) whose output signal ΔU corresponds to the control deviation, which is then used to affect the excitation of the DC motor 9, in particular the excitation current E. The field of the DC motor 9 is thereby weakened or strengthened, depending on the magnitude of the output signal ΔU.

To affect the motor field, the output signal ΔU is supplied to the first input of a second control unit 25. This second control unit 25 is preferably a PI-controller and controls the excitation current E. The supplied output signal ΔU can therefore be viewed as a nominal excitation current signal E*. The actual value E of the excitation current is supplied from a measuring unit 27 that measures the excitation current in the excitation current circuit to the second input of the second control unit 25. A comparison between the two signals ΔU=E* and E produces at the output of the second control unit 25 an output signal ΔE representing the control deviation, which is used for directly adjusting the excitation current E.

The excitation current E is supplied by a controllable line rectifier 29 which has an input connected to the three-phase power grid 17 and an output connected to the excitation winding 11. It will be understood that another energy source may also be used. The power grid rectifier 29 supplies the required excitation current E to the excitation winding 11.

It should be noted that an excitation current controller for the excitation current E in the excitation winding 11 is subordinate to the DC voltage control for the input voltage U of the DC motor 9.

The peak power MPP is incrementally adjusted and measured, i.e., using small steps in the excitation current E, using the afore-described oscillatory control method.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and included equivalents of the elements recited therein:

1. A method for operating a photovoltaic system having a DC motor electrically connected to a plurality of photovoltaic modules and an AC generator driven by the DC motor and electrically connected to a power mains, the method comprising the steps of:
   repeatedly measuring electric power supplied by the plurality of photovoltaic modules to the DC motor; and
   changing an excitation field of the DC motor to adjust the supplied electric power to a peak power which the plurality of photovoltaic modules is capable of delivering at a current ambient temperature and a current incident solar radiation intensity.

2. The method of claim 1, wherein the supplied electric power is determined by measuring a DC voltage at the DC motor and a DC current supplied to the DC motor by the plurality of photovoltaic modules.

3. The method of claim 1, wherein the peak power is determined by stepwise changing an excitation current of the DC motor, until the electric power supplied by the plurality of photovoltaic modules produces a power level which can be regarded as the peak power.

4. The method according to claim 3, further comprising the steps of after determining the peak power level, identifying a change in the peak power level by incrementing or decrementing the excitation current in defined time intervals; and setting the peak power to the changed peak power level.

5. The method according to claim 3, further comprising the step of maintaining the determined peak power for an approximately constant ambient temperature and an approximately constant incident solar radiation intensity and a fixed power mains by causing the excitation current to incrementally oscillate in defined time intervals about an optimum excitation current that produces the peak power.

6. The method according to claim 4, wherein each defined time interval is less than 1 second.

7. The method according to claim 5, wherein each defined time interval is less than 1 second.

8. The method according to claim 4, wherein each defined time interval is less than half a second.

9. The method according to claim 5, wherein each defined time interval is less than half a second.

10. The method of claim 1, wherein to shorten the time required for starting up the photovoltaic system, the excitation current is increased incrementally from a first predetermined experimental value to an optimum excitation current that produces the peak power, or is decreased incrementally from a second predetermined experimental value to the optimum excitation current that produces the peak power.

11. A photovoltaic system comprising:
   a plurality of photovoltaic modules;
   a DC motor having an input electrically connected to the photovoltaic modules and receiving from the photovoltaic modules a DC voltage and a DC current;
   an AC generator driven by the DC motor via a shaft and producing an AC output voltage capable of being supplied to a power mains;
   a first control unit having two inputs and an output, wherein the first input receives the DC voltage from the DC motor; and
   a computing unit having a first input receiving the DC voltage from the DC motor and an output producing an output signal, which is iteratively computed and adjusted by the computing unit in accordance with a maximum permissible peak power for a current incident solar radiation intensity and a current ambient temperature and supplied to the second input of the first control unit,
   wherein in response to the signals received at the first and second input, the first control unit produces at the output an output signal which causes an excitation field of the DC motor to change, so that the DC motor generates the maximum permissible peak power.

12. The photovoltaic system of claim 11, wherein the computing unit further comprises a second input receiving an actual value of the DC current produced by the photovoltaic module, with the output signal being iteratively computed and adjusted by also taking into account the actual value of the DC current.

13. The photovoltaic system of claim 11, wherein the first control unit comprises a proportional-integral (PI) controller.

14. The photovoltaic system of claims 11, wherein the DC motor is an externally excited DC motor, and wherein the output signal of the first control unit controls an excitation current of the DC motor.

15. The photovoltaic system of claim 14, further comprising an excitation current measuring unit and a second control unit having two inputs and an output, wherein the output signal of the first control unit is applied to a first input of the second control unit and an excitation current signal measured by the excitation current measuring unit is applied to the second input of the second control unit.

16. The photovoltaic system of claim 15, wherein the second control unit comprises a proportional-integral (PI) controller.

17. The photovoltaic system of claim 14, further comprising a converter receiving electric power from the power mains for supplying the excitation current to the DC motor.

18. The photovoltaic system of claim 15, further comprising a converter receiving electric power from the power mains for supplying the excitation current, wherein the converter is controlled by an output signal produced at the output of the second control unit.

19. The photovoltaic system of claim 11, wherein the system is designed for an output power of more than 800 kW.

20. The photovoltaic system of claim 11, wherein the power mains is a public power grid with a constant internal resistance, as perceived from the AC generator.

21. The photovoltaic system of claim 11, wherein the AC generator is a synchronous three-phase generator.

22. The photovoltaic system of claim 21, wherein the three-phase generator supplies an AC voltage of about 400 V.

23. The photovoltaic system of claim 11, wherein the AC generator is a synchronous AC generator.

* * * * *